March 28, 1939.  W. MESSINGER  2,152,556
STRAIN GAUGE
Filed March 12, 1936
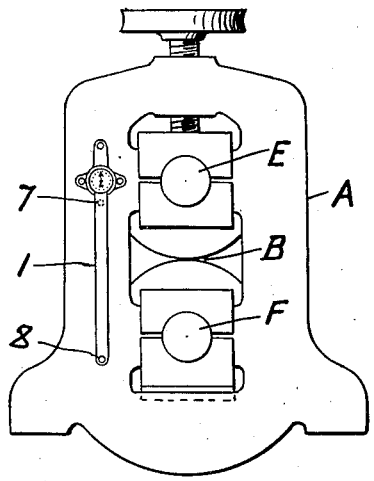
FIG. 1.
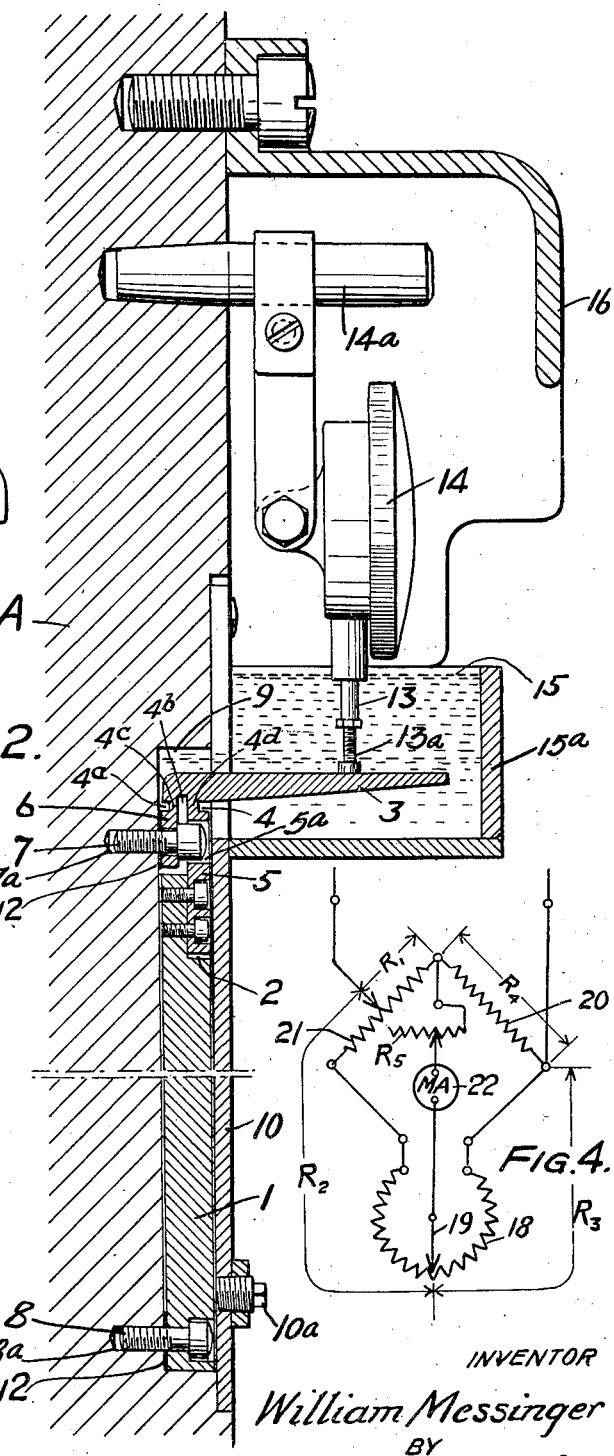
FIG. 2.
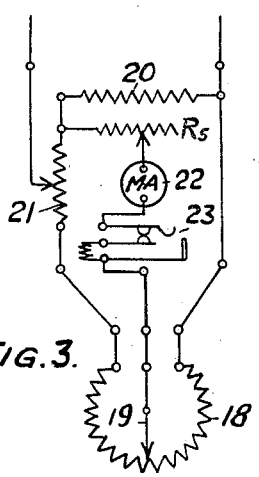
FIG. 3.
FIG. 4.
WITNESS:
INVENTOR
William Messinger
BY
Brown, Critchlow & Flack
ATTORNEYS Patented Mar. 28, 1939

2,152,556

UNITED STATES PATENT OFFICE 2,152,556

STRAIN GAUGE

William Messinger, Philadelphia, Pa., assignor to United Engineering & Foundry Company, Pittsburgh, Pa., a corporation of Pennsylvania Application March 12, 1936, Serial No. 68,434

3 Claims. (Cl. 265—12)

This invention relates to an improvement in strain gauges and more particularly to a mechanism of this character for measuring the stresses in machine frames and especially rolling-mill housings and roll-neck bearings.

The object of this invention is provide a highly sensitive and accurate means for measuring and visibly indicating the magnitude of the variable forces transmitted by the structural members of machines. Another object of the invention is to reproduce these indications at a remote point. Another object is to provide means for making a permanent record of the forces measured. A still further object is to provide for preventing temperature changes in the machine frame from affecting the operation of the measuring mechanism. In particular, the invention is intended for application to the mill housings of rolling mills, to indicate continuously the intensity of the load upon the mill rolls and the roll-neck bearings.

With these objects in view and others that will develop in the ensuing description, the invention generally stated, comprises a metal bar with terminal fastenings, instrumental in compelling a reduced portion of the bar to sustain stress proportional to the stress received by the machine element to which the bar is fastened; a lever projecting from a portion of the bar, preferably in right angle direction, which may be secured to the bar or be an integral part of it, and which delivers an amplified manifestation of tensile or flexural strain of the reduced portion of the bar; and a mechanical indicating mechanism with or without suitable electrical transmitting and recording apparatus.

The system employed is based on the fact that the deformations of elastic bodies are directly proportional to the applied loads. When the bearings of a machine are subjected to loading, forces, proportional to the load, are transmitted through the machine frame. The resulting elastic deflections of the frame, which are proportional to these forces serve as a direct measure of the bearing loads. Calibration may be accomplished by stressing the machine a known amount, preferably using hydraulic means, and observing the corresponding indication of the instrument.

Other objects of the invention will appear from the following description in which the invention will be more fully explained and at the end of which the invention will be claimed.

In the following description reference will be made to the accompanying drawing forming part hereof and in which:

Figure 1 is a diagrammatic end view of a rolling-mill housing showing a strain gauge, embodying features of the invention, applied to it.

Figure 2 is a side view partly in section drawn to an enlarged scale and illustrating a strain gauge, embodying features of the invention, in application to a machine frame, and Figures 3 and 4 are electrical wiring diagrams illustrating means for transmitting indications of the gauge to a remote point and for recording the same, if desired.

In the following description reference will be made to the application of the strain gauge to the housing A of a rolling mill for the purpose of indicating the pressures existing between the mill rolls and the load on the bearings of the rolls, but it is not the intention to limit the use of the gauge to these specific purposes alone.

In the drawing, 1 is a bar which is utilized to convert into measurable movement the deformation of the mill housing produced by the variations in the load imposed on it, and is made sufficiently long to be responsive to deformation of a sufficient length of the housing to function properly. In the particular bar 1 shown, which it is to be understood may take other forms, a lateral notch 2 is provided at one of its ends. 3 is an L-shaped amplifying lever having its vertical limb slitted into two branches 5 and 6 by the notch 4b and each branch being incised at 4 and 4a to reduce the cross-section and facilitate bending of metal in the junction of the two limbs, disposed at right angles, of the amplifying lever. This lever could be made integral with bar 1 but it is chosen to make a slidable connection in the recess 2, in order to align the terminal holes in bar 1 and lever 3 accommodating the fastening screws, 7 and 8, with the tap-hole points of attachment 7a and 8a in the mill housing To facilitate the assembly of the screw 7 the vertical limb 5 of the lever 3 is provided with an opening 5a through which the screw is inserted and which is sufficiently large to avoid any binding of the screw head with the lever in operation.

As indicated the ends of the strain gauge bar 1 are connected by the screws 7 and 8 to the mill housing A at points disposed respectively above and below the roll pass-line B of the mill and midway between the inner and outer faces of the housing. This positioning may not be essential although it is recommended as the maximum elongation of the housing post is expected to occur at such position when the mill is stressed due to passing metal between the rolls, and when the roll-neck bearings E and F are loaded by the reacting screw-down pressure. Stretch or strain of the loaded mill-housing post causes the transmission of opposing forces through the constricted sections of the lever, mainly compression in 4c and tension in 4d. We may consider 4c as the point of application of a force at the short end of a lever in which 4d can be regarded as the fulcrum. A point on lever 3 where stem 13 of gauge 14 rests will move vertically an exaggerated amount compared to the relative movement between the upper end of the bar 1 and the upper contact point 7 and in the ratio of the relative remoteness of the contact point of stem 13 and of part 4c from the fulcrum 4d.

To eliminate errors due to thermal expansion the bar is made of the same material as the housing or of material having the same coefficient of expansion and is placed within a slot 9 machined in the mill housing and a metal cover-plate 10 mounted thereover flush with the housing surface. By so enclosing the bar it and the housing will remain at practically equal temperatures at all times. At its lower end the bar is firmly secured to the housing A by a cap screw 8, and its sides are prevented from rubbing against the slot walls by means of spacer washers 12.

This form of amplifying lever has the advantage of ruggedness, for there are no joints or contact areas to offer frictional resistance and become deranged in service. Near the end of the lever 3 there is applied the stem of a dial gauge 14 having its body fixed to the housing proper. The extension of the housing is amplified by the magnifying lever 3 and indicated by the dial gauge. In practice the deformations available for measurement are very small, a relative movement under maximum load, of .001", being typical. Under these conditions the ratio of the magnifying lever would be 10:1 so that the reading of the dial gauge, of constant .0001", would equal 100 graduations.

In the embodiment shown all the exposed parts of the strain-measuring system are immersed in a bath of light oil at height 15, the oil being retained by the cover plate 10 and a cup-like cover 15a. In this way these parts are protected against corrosive action and accumulations of dust and the bar 1 more effectively maintained at the same temperature as the housing. For removing this oil a threaded drain plug 10a is provided in the lower end of the cover plate 10. A heavy guard 16 is provided to protect the dial gauge and other projecting parts of the apparatus from injury.

In applying the device to any particular machine, the elastic constants and stresses may first be estimated from the dimensions. This information, in conjunction with the desired scale deflection of the indicator gives an approximation to the required length of extensometer or bar.

When the apparatus has been set up, the original gauge length may be modified by changing the location of the lower clamping screw 8 along the length of the bar. This may be accomplished by drilling additional holes for the screw in the bar and mill housing or in any other suitable way. Closer adjustment is accomplished by slightly altering the magnification ratio of the amplifying lever, which is done by adjusting the dial gauge 14 on its support 14a. For adjusting the indicating needle of the indicator after the indicator is installed an adjustable threaded section 13a is provided at the lower end of the lever engaging stem 13. It is important that these adjustments may be readily made in order that a convenient and integral relation between dial indications and bearing loads may be established at the time of the calibration.

The indications of the dial gauge may be transmitted and recorded by means of a Wheatstone bridge apparatus and suitable indicating and recording galvanometers, as will be explained in connection with the accompanying wiring diagrams, Figs. 3 and 4. In the lower position of Fig. 3 there is represented a small circular rheostat 18 which is fastened to the frame of the dial gauge 14. A light contact arm 19 is fixed to the central shaft of the gauge and rotates in correspondence with the indicating needle, thus varying the electrical resistance of the two rheostat legs in proportion to the indications of the gauge. Two additional resistance coils 20 and 21, the first fixed and the other variable, compose the remainder of the bridge circuit. A sensitive milliammeter 22 is also illustrated, together with a jack plug 23 for connecting in a recording instrument as desired.

The schematic wiring diagram, Fig. 4, shows the interconnection of the various elements in a more concise manner. With the needle of the indicator and the rheostat contact arm 19 in the position corresponding to zero load, the position of the slide wire on resistance coil 21 may be adjusted so that no current flows through the milliammeter. The relation necessary for this condition is that $R_1 \times R_3 = R_2 \times R_4$. When the contact arm is displaced from this neutral position, the condition of equilibrium is destroyed and a current will flow through the meter 22. This current will vary directly with the amount of rotation of the contact arm, and will be further modified in linear relation to the resistance of the meter circuit which is made adjustable by means of variable resistance $R_5$. It is therefore evident that resistance $R_5$ provides a means for equating the indications of the electrical instruments to those of the dial gauge. These circuits are actuated by a low direct current potential, approximately 10 volts, maintained constant by means of a voltage regulator.

This invention is not limited to the example described herein and which was chosen for illustrative purposes. Modifications in sizes and shapes may be made by those wishing to apply this invention to their particular requirements, without departing from the object and scope of the invention as defined in the appended claims.

I claim:

1. A strain gauge for stressed frames comprising a bar connected at one end to said frame and extended along a length of the frame with which it is used, means responsive to relative movement between the other end of said bar and the adjacent portion of said frame occasioned by deformation of the frame due to stresses set up in the frame for measuring the extent of said deformation between selected points on the frame, means encasing the bar with the frame and a liquid within said encasing means in intimate contact with said bar and the adjacent frame for maintaining said bar at substantially the temperature of the frame.

2. In combination a machine frame having a slot therein for accommodating a bar, a bar lodged in the slot and connected at one end to said frame, a cover plate sealing the slot, a liquid retained in the slot in intimate contact with said bar and adjacent portions of the frame whereby the bar and machine frame temperatures are preserved substantially unified, and means responsive to relative movement between the other end of the bar and the adjacent portion of the frame for measuring stresses accruing in said frame.

3. In combination a rolling mill housing having a vertical window therein for the reception of the roll chucks, an elongate bar attached at one end to said housing at one side of said window on the medial line of one of the walls thereof and disposed at right angles to the axis of the mill rolls and with its other end extending in the direction of the lines of force in the housing, a gauge head anchored with respect to the housing and connection for operation by the last mentioned end of said bar, means for encasing the bar with respect to the housing, and liquid means surrounding said bar and contacting said housing to maintain said bar at substantially the temperature of the adjacent portion of the housing.

WILLIAM MESSINGER.